Figure 1:
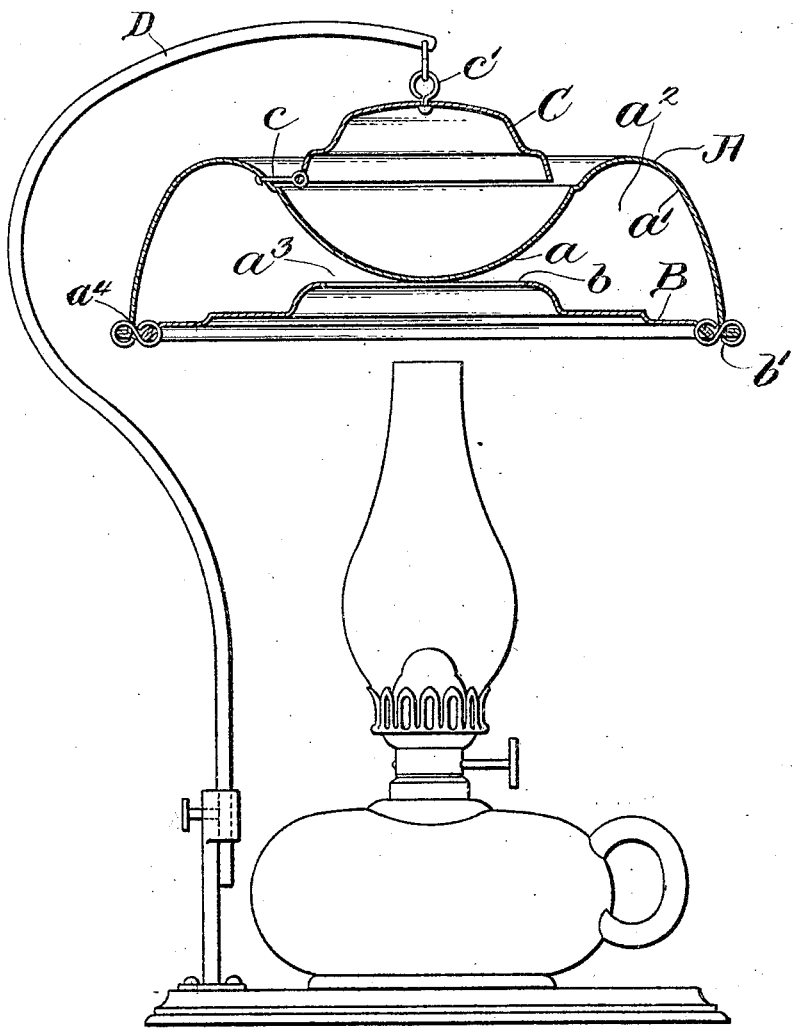

No. 800,568. PATENTED SEPT. 26, 1905.
O. W. GRAY.
ATMOSPHERIC HEATER.
APPLICATION FILED FEB. 3, 1905.

2 SHEETS—SHEET 1.

Witnesses:
Katharine A. Dugan
Samuel Friebe

Inventor:
Oscar W Gray
by
Ira L. Fish
Attorney.

UNITED STATES PATENT OFFICE.

OSCAR W. GRAY, OF BOSTON, MASSACHUSETTS.

ATMOSPHERIC HEATER.

No. 800,568. Specification of Letters Patent. Patented Sept. 26, 1905.

Application filed February 3, 1905. Serial No. 243,944.

*To all whom it may concern:*

Be it known that I, OSCAR W. GRAY, of Boston, in the county of Suffolk and State of Massachusetts, have invented certain new and useful Improvements in Atmospheric Heaters, of which the following is a specification.

The invention relates to that class of atmospheric heaters which are adapted for use in connection with lamps, gas-burners, or other source of light and heat for utilizing the heat developed by the illuminating device without interfering with the diffusion of light therefrom.

It is the object of the invention to provide a simple and compact heater of this character which shall present a large radiating-surface for diffusing the heat generated by the lamp or other lighting device and which shall also efficiently and uniformly spread the products of combustion and column of heated air rising from the lighting device and distribute them outwardly into the surrounding atmosphere. In accomplishing this result an important feature of the heater consists of a radiating-plate formed with an inverted dome which is arranged to lie in the center of the rising column of heated air and products of combustion generated by the lamp or other heating device, the plate being extended outward and downward from the base of the inverted dome, so as to direct the heated air, which is spread by the dome outward and in a downward direction, thus diffusing said air through the surrounding atmosphere. The space between the inverted dome and the downwardly-extending walls of the plate also forms a chamber within which the products of combustion and heated air rising from the lamp will be intermingled or mixed with the current of unheated or partially-heated air, which is carried upward or induced by the upward movement of the heated air. This air by being mixed with the more highly-heated air and products of combustion is raised in temperature, and the temperature of this air is further increased by being brought into close proximity to the radiating-surface of the plate. Thus a large volume of air is heated and thrown outward into the surrounding atmosphere.

The efficiency of the heater may be increased by arranging an annular plate below the domed radiating-plate and so connecting it with the radiating-plate that there is a space for the passage of the air between the inner edge of the annular plate and the radiating-plate and also a space for the passage of the air between the outer edge of the annular plate and the radiating-plate. The efficiency of the heater may be further increased by providing a cap-plate supported above the radiating-plate and connected therewith, so as to leave a free space for the passage of air between the lower edge of the cap-plate and the upper surface of the radiating-plate.

A heater provided with plates such as referred to occupies very little space and at the same time presents a large radiating-surface for diffusing the heat generated by the lamp, gas-jet, or other lighting device over which it is supported. By the action of the inverted dome and downwardly-extending walls an efficient circulation is created in the air about the lighting device, and thus a large volume of air is heated, and this air is forcibly thrown outward into the surrounding atmosphere, thus producing an efficient distribution of the heat generated by the lamp throughout the room in which it is being used.

The various features of the invention will be readily understood from the following detailed description of the heater shown in the accompanying drawings, which embodies said features in the form in which I prefer to employ them.

Figure 2:
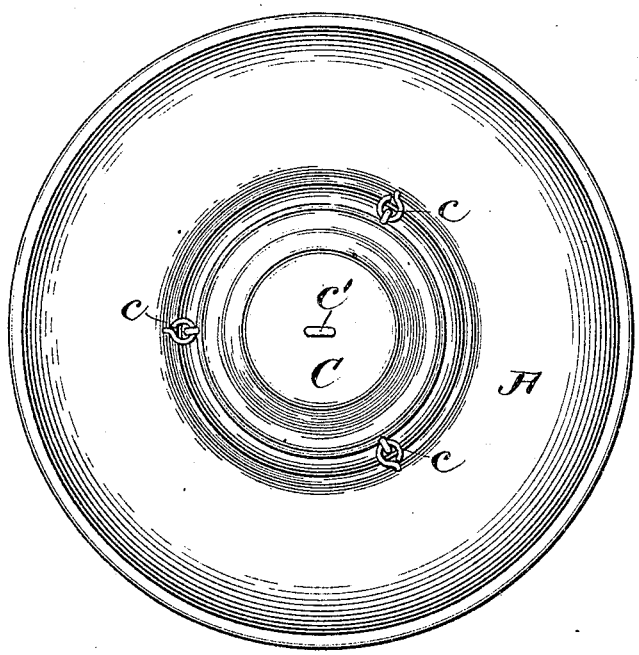
Figure 3:
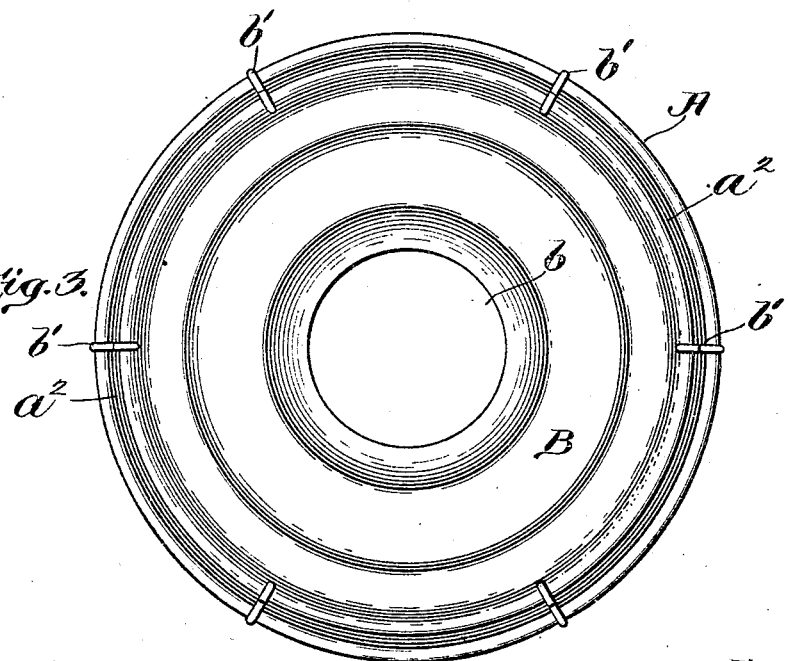

In the drawings, Figure 1 is a view showing the heater in section supported above a lamp of ordinary construction. Fig. 2 is a top plan view of the heater, and Fig. 3 is a view looking upward upon the bottom of the heater.

The heater shown in the drawings consists, essentially, of a radiating-plate A, adapted to be supported over a lamp or other heat-generating illuminating device in such position that the heated air and products of combustion rising from the lamp will strike against the under side of the plate, thereby heating said plate, so that the surface of the plate forms a radiating-surface for diffusing the heat absorbed thereby. The center of this plate is shaped into an inverted dome $a$, which lies directly above the lamp and acts to spread the heated column rising therefrom outwardly in all directions. From the base of the dome the walls of the plate extend outward and downward at $a'$, so that the air and gases which are spread by the dome are directed outward and downward by the walls of the plate and are thrown outward from the lower edge of the plate into the surrounding atmosphere.

The flow of the air and gases over the under surface of the plate A induces an upward flow of the air about the lamp, which air is heated to some extent as it passes upward near the lamp and is then intermingled and mixed with the hotter air and gases in the space $a^2$ between the downwardly-extending walls of the plate A and the dome $a$. This air also passes along the surface of the radiating-plate A and is also heated to some extent therefrom.

The radiating and distributing plate thus far described forms an efficient heater for diffusing and distributing the heat generated by the lamp or other lighting device and may be advantageously employed with or without the other parts shown in connection therewith. The efficiency of the heater is increased, however, by a second plate B, arranged below the plate A and separated therefrom by spaces through which the heated air and products of combustion may enter between the plates and after passing along the under surface of the plate A may be discharged into the surrounding atmosphere. As shown, the plate B is an annular plate provided with a central opening $b$ directly below the inverted dome $a$, the plate being so arranged that there is a suitable space $a^3$ between the edge of the opening $b$ and the dome $a$ for the passage of the upward current of air and gases. The plate B is also of such a diameter or is so shaped and connected with the plate A that there is a space $a^4$ between the outer edge of the plate B and the plate A, through which the heated air and gases may be discharged from the chamber $a^2$. The use of this plate B increases the radiating-surface presented by the heater and also increases the strength of the outward current of heated air discharged from the lower edge of the radiating-plate. The use of this plate also forms an inclosed mixing-chamber surrounding the inverted dome $a$, within which there is a more thorough mixing of the air passing into said chamber than would be the case were this plate not employed and the chamber left open at the bottom. This plate or diaphragm B may be connected with the plate A by any suitable connections and, as shown, is connected therewith by wire links $b'$. As arranged the plate B may be utilized to support the heater upon the globe or lamp-shade. In such case the plate will rest upon the top of the shade or globe, the opening $b$ in the plate being brought into position to register with the opening in the globe or shade.

The inverted dome $a$ is arranged directly above the flame of the lamp or gas jet and in the direct path of the hot products of combustion rising therefrom, and consequently this part of the radiating-plate will be raised to a high temperature. To more efficiently diffuse the heat radiating from this portion of the radiating-plate, the heater may be provided with a cap-plate C, connected with the plate A above the dome $a$ and separated from the plate A by a space through which the heated air rising from the upper surface of the dome $a$ may be deflected outward into the surrounding atmosphere. This plate C not only acts to throw the heated air outward, but also becomes heated and acts as a radiating-surface for further diffusing the heat generated by the lamp. This plate C may be of any suitable size, shape, and configuration and may be connected with the radiating-plate A in any suitable manner. As shown, this plate C is connected with the plate A by wire links $c$. The plate C, as shown, is also provided with a ring $c'$, by which the heater may be suspended from a support D or any other suitable supporting device.

Without attempting to point out all the various forms and modifications in which the features of my invention may be embodied, what I claim, and desire to secure by Letters Patent, is—

1. An atmospheric heater comprising a radiating-plate adapted to be supported above a lamp or gas jet formed with an imperforate central inverted dome and walls extending outward and downward from the base of the dome, and a free space extending substantially throughout the entire lower edge of the plate for the discharge of gases whereby the ascending current of heated air and products of combustion are thrown outward and downward in all directions and are intermingled within the space about the dome with the induced current of unheated air.

2. An atmospheric heater comprising a radiating-plate formed with a central inverted dome and walls extending outward and downward from the base of the dome, an annular plate beneath said radiating-plate and connected therewith to leave free spaces extending substantially about the entire lower edge of the radiating-plate through which the gases are discharged in all directions.

3. An atmospheric heater comprising a radiating-plate formed with a central inverted dome, and walls extending outward and downward from the base of said dome, an annular plate beneath said radiating-plate and connected therewith to leave free spaces extending substantially about the entire lower edge of the radiating-plate through which the gases discharge in all directions, and a cap-plate connected with the radiating-plate above the dome and having its lower edge separated from the radiating-plate by a free space.

In testimony whereof I have affixed my signature in presence of two witnesses.

OSCAR W. GRAY.

Witnesses:
 IRA L. FISH,
 KATHARINE A. DUGAN.